(12) United States Patent
Acharya

(10) Patent No.: US 9,349,179 B2
(45) Date of Patent: May 24, 2016

(54) LOCATION INFORMATION DETERMINED FROM DEPTH CAMERA DATA

(71) Applicant: Microsoft Corporation, Redmond, WA (US)

(72) Inventor: Sunil P. Acharya, Cupertino, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 96 days.

(21) Appl. No.: 13/891,965

(22) Filed: May 10, 2013

(65) Prior Publication Data

US 2014/0334669 A1 Nov. 13, 2014

(51) Int. Cl.
*G06K 9/00* (2006.01)
*G06T 7/00* (2006.01)
*G06K 9/32* (2006.01)
*G06F 3/01* (2006.01)
*G06F 3/03* (2006.01)

(52) U.S. Cl.
CPC .............. *G06T 7/004* (2013.01); *G06F 3/017* (2013.01); *G06F 3/0304* (2013.01); *G06K 9/00208* (2013.01); *G06K 9/00302* (2013.01); *G06K 9/00624* (2013.01); *G06K 9/00778* (2013.01); *G06K 9/3241* (2013.01)

(58) Field of Classification Search
CPC ..... G06F 3/017; G06F 3/0304; G06K 9/3241; G06K 9/32; G06T 7/004

USPC ........................................................... 382/103
See application file for complete search history.

(56) References Cited

U.S. PATENT DOCUMENTS

| | | | |
|---|---|---|---|
| 6,556,875 B1 * | 4/2003 | Nagasaka et al. .............. 700/19 |
| 2004/0183775 A1 * | 9/2004 | Bell ............................. 345/156 |
| 2005/0093697 A1 * | 5/2005 | Nichani et al. ............. 340/545.1 |
| 2006/0109811 A1 | 5/2006 | Schotten et al. |
| 2011/0131338 A1 * | 6/2011 | Hu ....................... H04W 76/02 709/229 |
| 2011/0143779 A1 * | 6/2011 | Rowe et al. ................ 455/456.3 |
| 2012/0169880 A1 | 7/2012 | Williamson |
| 2012/0194517 A1 * | 8/2012 | Izadi ....................... G06T 17/00 345/420 |

OTHER PUBLICATIONS

"International Search Report & Written Opinion Issued in PCT Patent Application No. PCT/US2014/037405", Mailed Date: Aug. 6, 2014, 10 Pages.

* cited by examiner

*Primary Examiner* — Gregory F Cunningham
(74) *Attorney, Agent, or Firm* — Gregg Wisdom; Judy Yee; Micky Minhas

(57) ABSTRACT

The subject disclosure is directed towards obtaining relatively precise location data with respect to a mapped space, based upon depth camera coordinates, for tracking a user or other object within the space. Also described are usage scenarios and user experiences that are based upon the current location data.

20 Claims, 6 Drawing Sheets

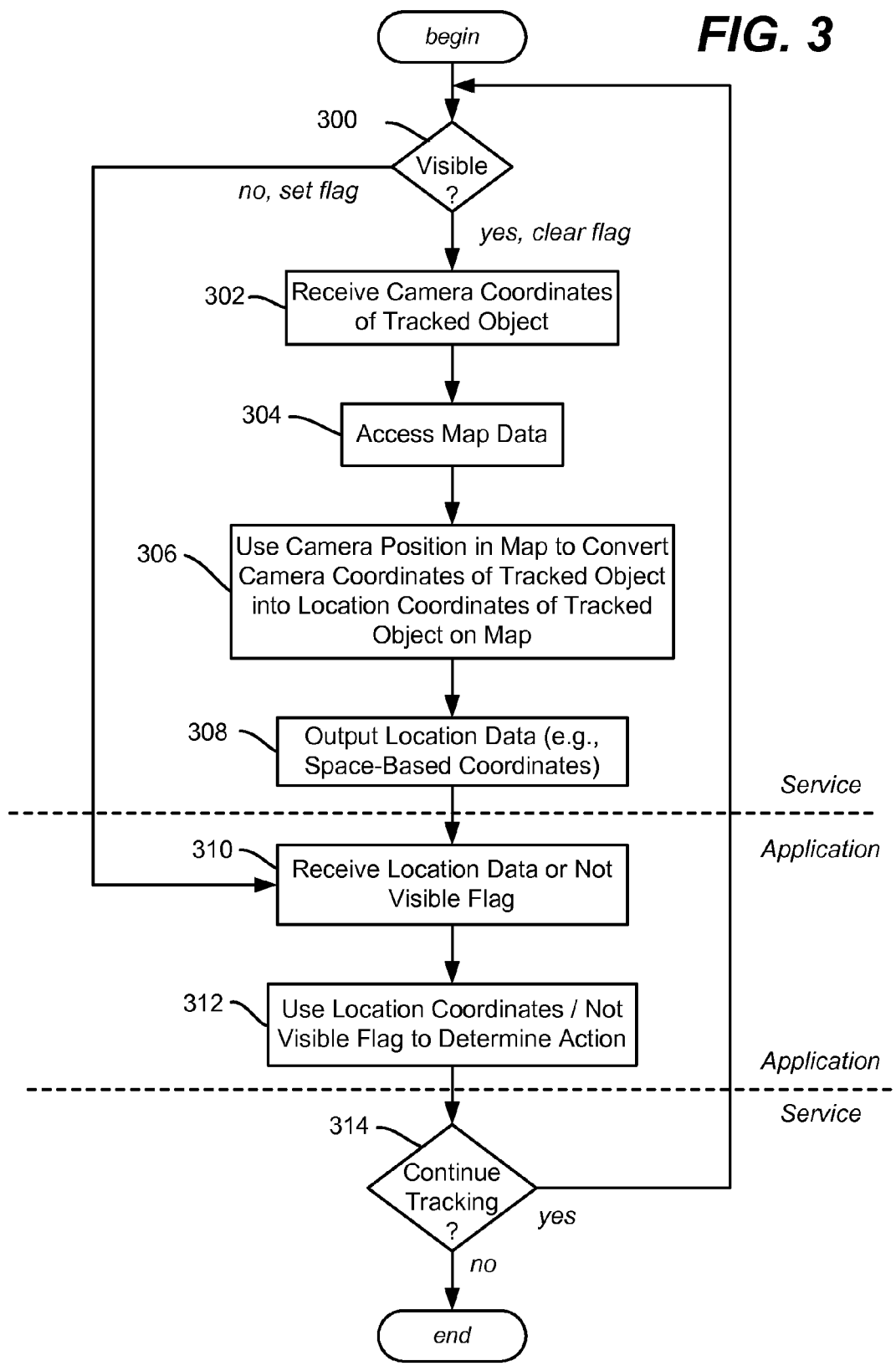

LOCATION INFORMATION DETERMINED FROM DEPTH CAMERA DATA

BACKGROUND

Depth cameras, such as used in Microsoft Corporation's Kinect™ technology, provide depth and other information that may be used for many purposes, including gaming. In general, such relatively inexpensive, commercially available cameras are based upon time-of-flight, where emitted infrared radiation is reflected back to a sensor, with the reflection time corresponding to the distance to objects in the field of view, and/or structured light-based sensing. Given that the camera also may capture clean infrared (and/or RGB data), a depth camera provides (or allows a simple computation of) X, Y and Z data in the camera's local coordinate system for any captured objects in the camera's field of view.

While gaming is one type of application that benefits from such data, a large number of other applications may similarly benefit from knowing the coordinates of users and objects. While applications have used the camera's local coordinates for various purposes, particularly gaming, heretofore the use has been generally limited to interaction with a device such as a gaming console coupled to the camera.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards processing camera data to determine a location within a space. Camera data corresponding to camera-based coordinates are converted into location data based upon a map of the space. The location data is output, and thereby useable for various scenarios and/or user experiences. A cloud service (any set of one or more networked servers, however configured), for example may make the location data accessible to any number of applications and/or devices.

In one aspect, a service is coupled to or incorporates a location conversion mechanism that is configured to convert camera-based coordinates into location data representative of a user location within a mapped space. The conversion mechanism bases the location data upon map data associated with the mapped space. The service is further configured to output the location data to one or more devices or applications.

In one aspect, location data that is based upon camera coordinates is received and used to take action. Example actions based upon the location data may include at least one of: selecting content for output, modifying game play, controlling power, controlling audio output, controlling video output, signaling a device with remote control codes, and/or controlling at least one setting.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 3 is a flow diagram showing example steps that may be taken to obtain and use location data based upon camera sensing, according to one example implementation.

DETAILED DESCRIPTION

Figure 1:
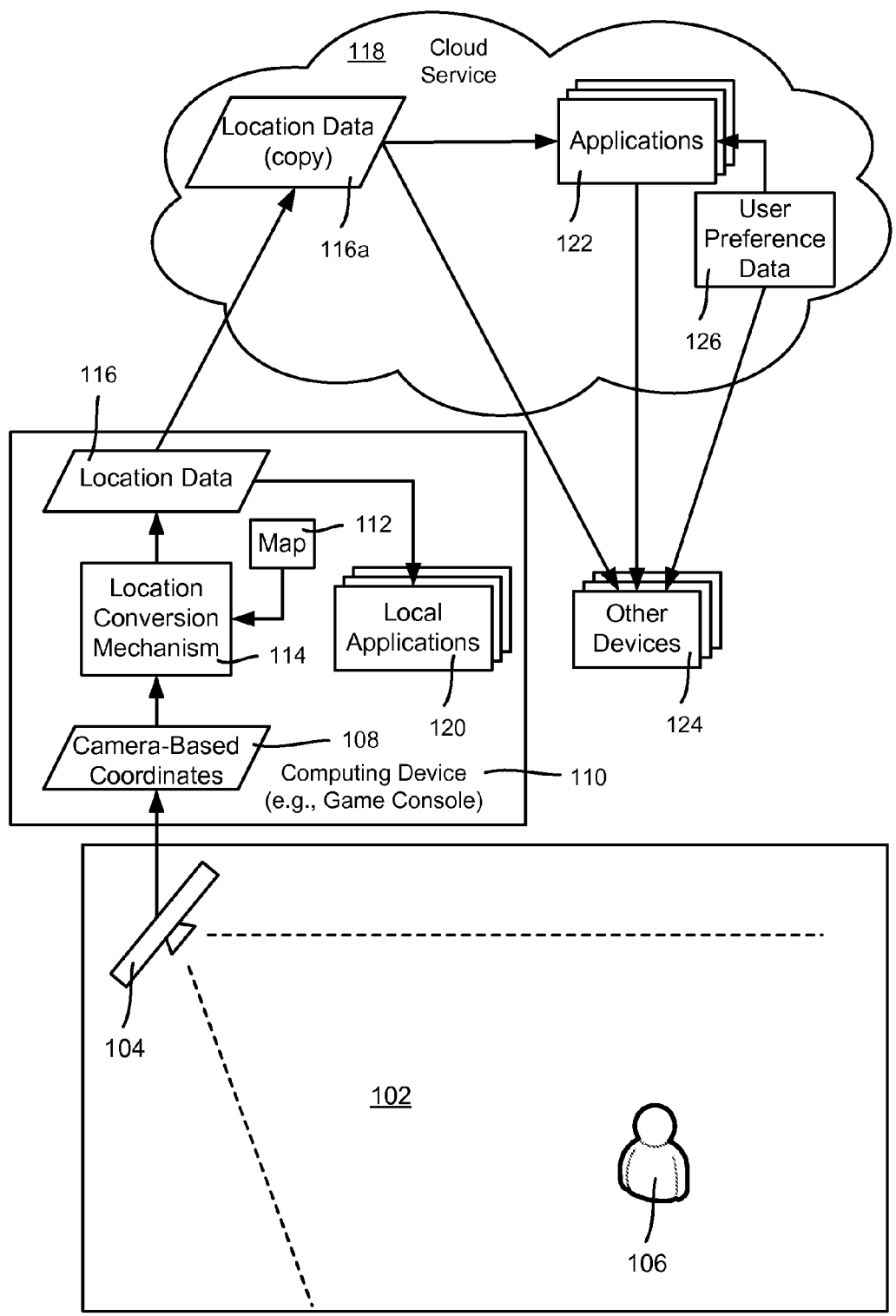
FIG. 1 is a representation of example components configured to sense a user's location within a space via a camera, and to provide location data to application and/or device consumers according to one example implementation.

Various aspects of the technology described herein are generally directed towards determining and tracking location data (e.g., space-based coordinates) corresponding to a relatively precise location (or locations) of one or more moveable objects (e.g., users) in a mapped residential and/or commercial space. Actions may be taken (or not taken) by applications and devices based upon the location data.

Location determination and tracking may be based upon depth camera data. In this way, a user need not actively perform any activity in order to be tracked once tracking starts; for example, a user need not wear a tracking device, speak, gesture or so forth (although such activities also may be performed to augment the technology described herein in other ways).

The coordinate/location information may be uploaded to a cloud service or the like. This facilitates tracking of a user to provide an immersive experience with any connected device or device, as well as usage by various applications. For example, the location data may be used by different devices (e.g., smartphone, tablet, personal computer, gaming console and so on) to generate content based on location-based context. Other actions may be based upon the presence or absence of a user with respect to a room.

In one aspect, coordinates of a user that are relative to a space (not necessarily the depth camera's location) are determined and provided to consumers (e.g., applications and/or devices) for use as desired. By way of example, one or more depth cameras may be arranged in a house, with the camera-based coordinates from the camera or cameras transformed to be relative to a "map" of the house into space-based coordinates. As a result, whenever a user is in any camera's field of view, applications know "precisely" where in the house a user is currently located (as well as where not located). Note that as used herein, a "precise" location is not intended to convey any actual measurement level, but rather close enough to be sufficient for an application's purposes, e.g., within ten feet may be close enough for one application. The coordinates may be uploaded to a cloud service, so that any authorized application or device can obtain the coordinates, whether by pulling them from the cloud in a request/response type of communication, or by having the cloud push the coordinates to the application or device.

In this way, for example, applications can perform automated location-based operations relative to the user. As some examples, based on where a user is currently located, an application may turn on and off (and/or dim) lighting, control temperature, pause or restart a digital video recorder (DVR), perform smart security based upon identity and so on. Indeed, within a room the same pair of stereo speakers may be automatically balanced based upon where a user is located within the room, including when the user paces back and forth. Note that a single camera may be used to make such decisions, e.g., an action may be taken or not taken based upon whether the user is currently in a given room or not.

With multiple cameras, many more scenarios may benefit from such location data. As one example, a television show or other video and/or audio may automatically "follow" a user from room to room, by switching to a different screen/speakers based upon the user's current location. Only the closest telephone handset may ring when a call comes in. As can be readily appreciated, any or all of the applications and/or actions may be user configurable, so that one user's preferences and resulting experience are not necessarily the same as another user's.

Games may be played in different rooms, including by switching a game to and from a display screen coupled to a gaming console a tablet, smartphone or other device, and vice-versa based upon the user's location. Immersive multi-room games are also enabled, e.g., an exercise-type game may have a player run up and down stairs and/or from room to room instead of running in place; a child may play a game that has him or her hunt for hidden items in different rooms while interacting with one or more devices, and so forth.

In other scenarios, the location data may be used outside of the home. For example, while a user is in the home, the user's coordinates are uploaded to the cloud for use with various applications as exemplified herein. When the user leaves the house, GPS coordinates from a smartphone or the like may track the user's general location. Thus, for example, when a user leaves his or her home, a song that is playing in the home may be paused (and turned off in the home to save energy), and resumed on the car speakers when the user starts his or her car. When the user enters a public place, such as a shopping mall where GPS no longer reliably works, similar cameras arranged in the mall may locate the user and, for example, target an advertisement to the user or a class of users to which the user belongs.

It should be understood that any of the examples herein are non-limiting. For one, while a depth camera is used as an example of a suitable location sensor, any 3D/2D camera system and/or any device that can provide relatively precise location information, including indoors, may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in obtaining and using location data in general.

FIG. 1 shows a general conceptual diagram in which a room 102 is sensed by a depth camera 104. When a user 106 is in the room, the camera-based coordinates 108 (e.g., X, Y and Z, although polar coordinates may be used) of the user relative to the camera 104 are known or easily computed, e.g., provided to a computing device 110 such as a gaming console to which the camera 104 is coupled. The camera-based coordinates 108 are updated sufficiently frequently so as to track the user's location much faster than the user can move for practical purposes.

The computing device 110 includes a map 112 or the like that the computing device 110 may use, e.g., via a location conversion mechanism 114, to convert to the camera's sensed coordinates to a different coordinate system. For example, instead of being relative to the camera, the camera-based coordinates 108 are converted so as to be relative to the map 112 of the house, (or even global coordinates relative to the world, for example) into location data 116, such as space-based coordinates; this may be provided as part of a service of the gaming console or other computing device, for example. To track the user, the location data 116 are updated as the user 106 moves.

Once the location data 116 of the user 106 are determined, various applications and/or devices may use this information to perform actions on behalf of the user. For example, the location data 116 may be used by one or more local applications 120 as desired. An uploaded copy 116a to a cloud service 118 or the like of these location data may be used by one or more cloud applications 122, downloaded to one or more other devices 124 (applications thereon) and so forth; (note that the uploading and/or downloading may be at a sampling rate and/or based upon some threshold movement limits so as to not unnecessarily use bandwidth). User preference data 126 (shown in the cloud service 118 but also available to any local applications 120 even without a cloud connection) allows a user to customize the user experiences for various applications and usage scenarios, e.g., those applications and usage scenarios desired by the user. Various example applications and example usage scenarios are described below.

In one alternative, the location conversion mechanism and map may be located in the cloud rather than on a local computing system. This may be beneficial, for example, when multiple cameras are sensing the user at various times, since each camera (or device to which the camera is coupled) may have a connection to the cloud but not a direct connection to each other. A possible disadvantage is when the cloud is not available; e.g., when the internet provider service fails, some location-based actions such as control of lighting may become problematic. Another possible issue is latency; e.g., a stereo system may not be able to balance its speakers quickly enough if the user moves too rapidly and the location information needs to travel to the cloud and back; indeed, opposite "balancing" may occur. Such scenarios may benefit from having local applications 120 process the location data 116 to take the action.

Figure 2:
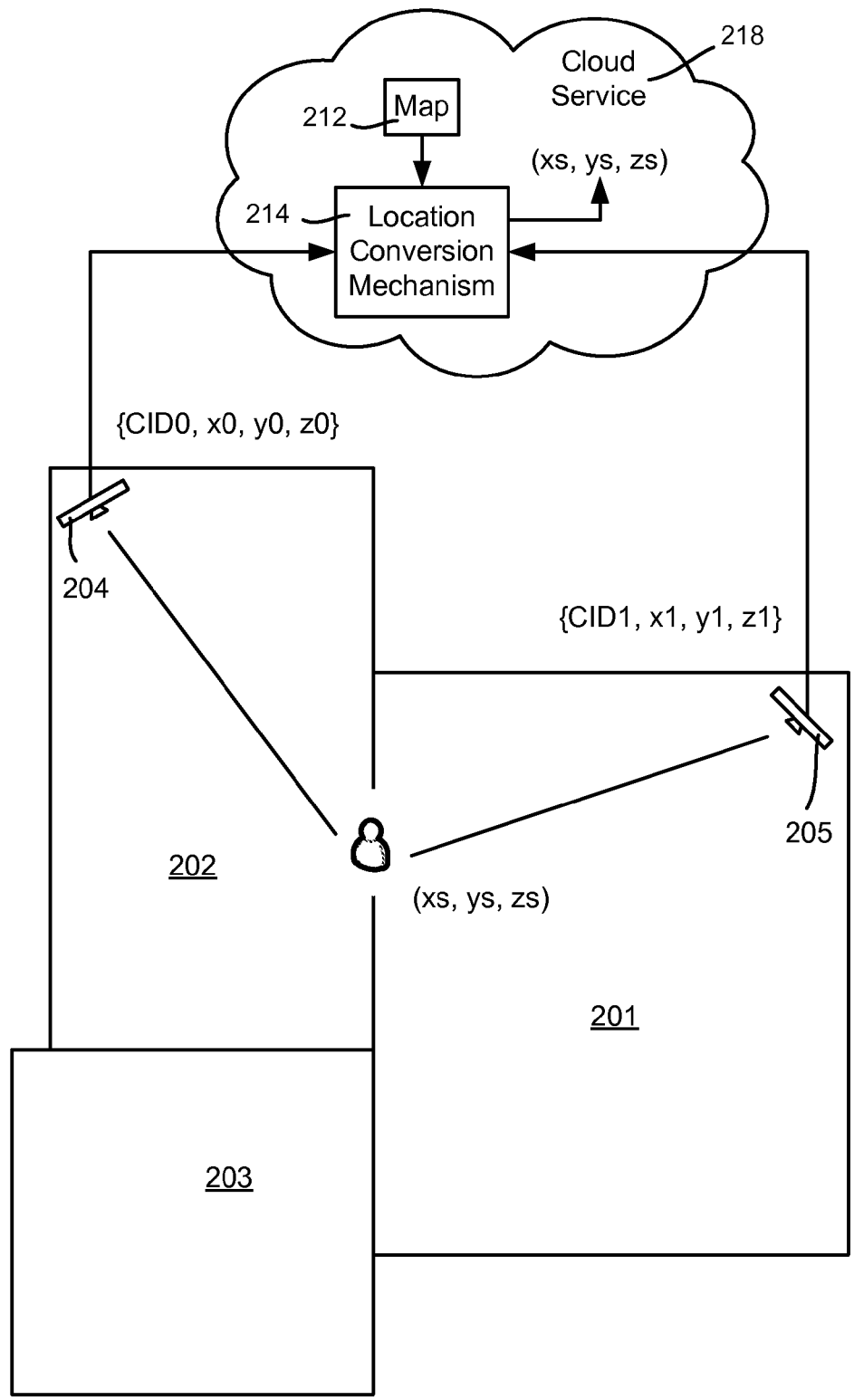
FIG. 2 is a representation of a plurality of cameras covering multiple rooms in a space, with camera data used to provide location data, according to one example implementation.

As exemplified in FIG. 2, multiple cameras may be used so as to capture data in more than one room in a space such as a house or apartment; (the entire house need not be covered if, for example, the user desires complete privacy in a particular area). Thus, for example, in FIG. 2 the room 202 is covered by camera 204, the room 201 is covered by camera 205, while the room 203 is not visible to any camera, excepting, possibly, if a door (not shown) to the room is open.

In the example of FIG. 2, a map 212 of this space and a location conversion mechanism 214 are located on a cloud service 218. This is only one alternative, and as described herein, it is feasible to have one or more computing devices or the like at a non-cloud location determine the location data, e.g., space-based coordinates.

As can be seen, in FIG. 2 the camera identifiers (CID) and coordinates sensed by each camera (e.g., for a single user's location) are fed to the location conversion mechanism 214, e.g., as {CID0, x0, y0, z0} and {CID1, x1, y1, z1}. Based upon the map 212 for this space, the location conversion mechanism 214 determines the user location data in this space, e.g., as coordinates (xs, ys, zs). In this example, the map 212 is based upon this space-based coordinate system, whereby any application that has the map 212 thus knows where the user is located whenever the user is sensed by at least one of the cameras 204 and/or 205.

Some initial setup may be performed by the user when initially installing the depth camera or cameras to provide the space-based map. For example, the user may provide a "map" of the room and/or of the house/apartment to the computing device 110, possibly using software (e.g., coupled to the camera) that assists with this task. Speakers, display screens and so forth also may be included in the map. This allows the computing device to register the space with a map providing detailed information for the space, such as a house, (which is already being done for public places such as malls, stadiums and the like).

This mapping aspect can be automated by an application which can help map out the fiducials in the scene (e.g., walls, floors, ceiling, relatively fixed furniture and so forth) and then aligning them with the space that the camera is viewing. For example, automated, intelligent mapping assistance is feasible. For example, as part of an initial mapping, a user may be instructed to walk around with some object the computer system is trained to recognize and record distance thereto as sensed by the camera. For example, the user may be instructed to hold the object against the walls, windows, floor and ceiling corners and stationary furniture to generate a distance map of the room. If two cameras can see the object at the same time, then the computing device or devices to which the cameras are attached (any two or more computing systems are linked via the cloud or other network connection) may learn their own relative locations, which can be added to the map. The program may guide the user to identify speakers and display screens, although, for example, if the user is using a tablet computer or smartphone as the recognized object, the user may hold the device close to an entity to be mapped and select "wall," "floor," window," "ceiling" "speaker," "display screen" and so forth from a device display, as appropriate. The user also may manually assist in building the map, such as by data entry. If a camera is moved, remapping may be performed, although it is also feasible for the camera to recognize something in the room (e.g., a painting) that is seen from the camera's previous and current positions and adjust its position in the map accordingly.

With the depth camera viewing the space, a user identifier (e.g., gamertag) may be easily determined in various ways, including through a manual login operation, or automated image identification/facial recognition, and so on. Once the user is logged in, the user's location data relative to the mapped space are known, and this data may be used locally and/or uploaded to the cloud service for use by many applications and devices (Smartphone, Tablet, PC, gaming consoles). In this way, devices that are connected to the cloud but that do not have the ability to get real time depth information in the room can download the location information and use it further to enhance their feature set.

As can be readily appreciated, the technology described herein is not limited to tracking the location of a single user, but rather can track any practical number of users. Note that contemporary gaming console applications are capable of differentiating users based upon facial recognition, although head tracking, skeletal data and so forth also may be used. The actions taken by a given application may be customized for a given user, e.g., a first user in one room hears a different song than a second user in another room, with the playlist customized for that user; (note that it is feasible to steer different audio and/or video to different users in the same room, even from the same speakers and/or display screen). Conflict resolution may be appropriate, e.g., two users who prefer different temperatures can have the thermostat controlled to average the desired temperatures of both users.

Note that certain appliances and the like are not necessarily intelligent in that they cannot run applications and thus cannot use the location data/map directly. Other devices may be able to run programs, but may not have a way to connect to the cloud. However, such devices may be able to be remotely controlled in another way, whereby a cloud application (or local application) may decide what action to take and accordingly remotely control such a device. For example, consider a DVR that can be controlled by an infrared (IR) remote control device, but cannot use and/or receive location data. A cloud application can decide what action to take based upon a user's location data, and send a signal to another device that is coupled to an IR blaster whose signals are detectable by the DVR. By outputting control codes for the DVR through the blaster, for example, the DVR may be controlled to pause a show when the user leaves the room, and restart the show when the user reenters the room, even though the DVR itself has no knowledge of the user's location.

As is understood, location-based sensing as described herein is not limited to private spaces such as homes and apartments, but further may be implemented in public places (offices, malls, sports stadiums and so forth). For example, rather than have a user set a program to indicate that the user is out of his or her office, based upon location data as described herein, the program may indicate some other status, e.g., that the user is walking towards his or her office, and possibly estimate an expected arrival time.

Knowing where a user is also allows for smart security systems. For example, if a user is recognized as being at the office, then (based upon other data and settings that may be accessed, such as indicating that the user's spouse is also not home), an alarm system may be turned on. The turning off of an alarm may be based upon tracking the user along with facial recognition, for example. A user may have specified electrical outlets turned off, such as to turn off an outlet by an ironing board location when not at home or when not in the room for some period of time.

In another usage scenario, feeding a user's location information to the cloud in real time allows a system to further mine and infer users' likings, habits and so forth, and use this information to provide content such as relevant advertising in both real time and at a later date. Note that a user may be tracked by GPS coordinates while traveling to a public location, so that the user is expected, whereby facial recognition of that user among many users may be easily performed.

Based on the location in the residence (kitchen, living room, bedroom and so forth) or commercial place (office, shopping center), content may be generated based on context. This helps the end user receive more relevant information (including advertising) and remain engaged, which also helps the content provider. Moreover, in other situations, groups of users may be tracked by location. For example, if at a shopping mall a camera senses potential shoppers and a program processing the data decides that eighty percent of those present are female, an electronic billboard or the like may output content accordingly, e.g., four out of five advertisements may be geared towards females.

FIG. 3 is a flow diagram summarizing example steps that may be taken to provide location data from a service such as a local service and/or cloud service, and use that data by some consuming entity. Step 300 represents determining whether a tracked object, which is typically a user, is visible to at least one camera; as described herein, a user or other object may be being tracked, but move out of the view of any camera. This is still useful information, as the lack of presence in a room may be used to dim the lights, turn off devices and so on. If not visible, a flag or the like is set to indicate this state, which is cleared when the user returns to visibility.

If visible, step 302 represents receiving the camera coordinates from one or more cameras. If multiple cameras sense the user, one of the camera's data may be used (e.g., the closest), although other alternatives may be used, such as compute location data for each which then may be averaged or otherwise merged, or some other mechanism may be used to determine the user's location data.

Step 304 represents accessing the map data, which step 306 uses to convert the camera coordinates to the location data, e.g., space-based coordinates corresponding to the map space. Step 308 outputs the location data (e.g., space-based coordinates), such as to the cloud or other consuming device or application. As described above, step 308 (and possibly steps 304 and 306) may be throttled based upon some sampling rate and/or threshold movement so as to not unnecessarily use resources.

Steps 310 and 312 represent some application or device using the coordinates, or the not visible flag, to determine some action to take or not take. Examples of taking or not taking actions are described with respect to FIGS. 4A, 4B and 5.

Step 314 represents determining whether to continue tracking, returning to step 300 if so. This may be controlled by a timer, (e.g., do not track after 10:00 PM, do not track for more than five hours, do not track if absent for more than an hour), or some other automated operation. Speech and/or gestures may be detected to turn tracking on or off. Indeed, tracking may be controlled by conventional interfaces such as a mouse, keyboard, remote control, or via another interface, such as Natural User Interface (NUI), where NUI may generally be defined as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other categories of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, as well as technologies for sensing brain activity using electric field sensing electrodes.

Figure 4A:
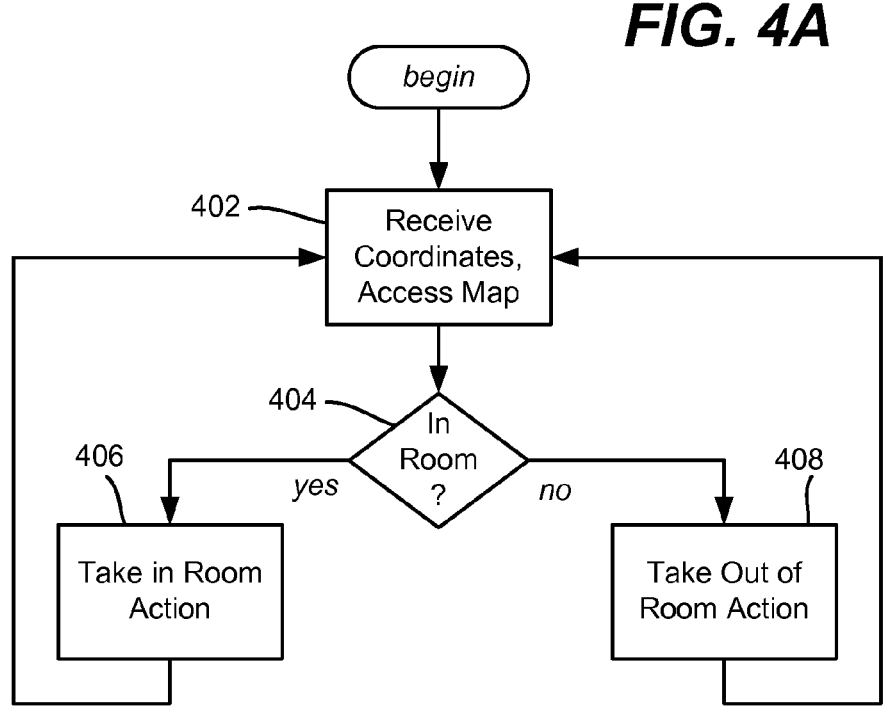
FIGS. 4A and 4B are flow diagrams representing example usages of location data, according to one example implementation.
Figure 4B:
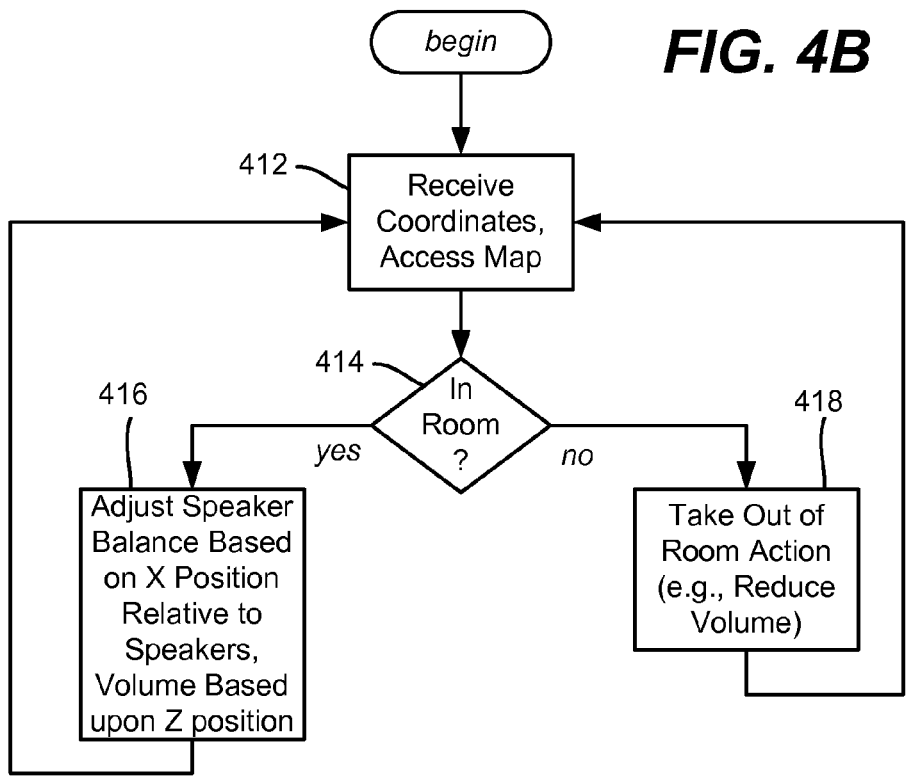

FIG. 4A is a simplified flow diagram related to taking actions, with FIG. 4B showing an example of how location data may be further used during an action. Step 402 of FIG. 4A represents receiving coordinates and accessing the map. This may be the camera-based coordinates for which the map is accessed to determine a location in the mapped space, or the space-based coordinates. Note that FIG. 4A makes a simple decision based upon whether a user is in a room or not, and thus the application or device that takes the action need not process the coordinates and the map if the cloud or another application does so and outputs an "in-room" or "not-in-room" status (whether pushed to a consuming application or pulled by the consuming application). In this way, not every application needs to deal with the coordinates and map, but may receive only the more-coarse grained location data that it needs for its purposes. A room may be broken into grids or the like in a similar way, with a consuming application receiving a room and grid identifier rather than coordinates. Thus, as used herein, "location data" may be as fine-grained as coordinates, or more coarse-grained, and one receiving entity may receive different location data from that received by another receiving entity for the same camera coordinates, e.g., based upon a desired/appropriate level of location data granularity for each entity.

In any event, a determination is made at step 404 as to whether a tracked object (e.g., user) is in a given room. If so, an action appropriate for that room is taken at step 406, such as to continue playing audio. If not, another action may be taken at step 408, such as to stop playing the audio. Note that although not explicitly shown in FIG. 4A, knowing the current location data and by estimating a trajectory from past location data, a prediction may be made as to when a user is approaching a given space. For example, audio may be turned on in a room if the user is predicted to be approaching that room.

FIG. 4B is similar to FIG. 4A, except that an example is provided with respect to audio output. Thus, after receiving the coordinates and accessing the map at step 412, if a user is in the room at step 414, step 416 operates based upon the X coordinate to balance the stereo speaker output for that user (assuming the camera is positioned such that X corresponds to left and right). The Z coordinate (and possibly the Y coordinate) may adjust the volume based upon the distance to the speaker. Note that other equalization may be performed, e.g., certain frequencies can be cut or boosted based upon the user's location within a room. If not in the room, an out-of-room action may be taken, e.g., reducing the volume or turning off the speakers so as to save energy.

Figure 5:
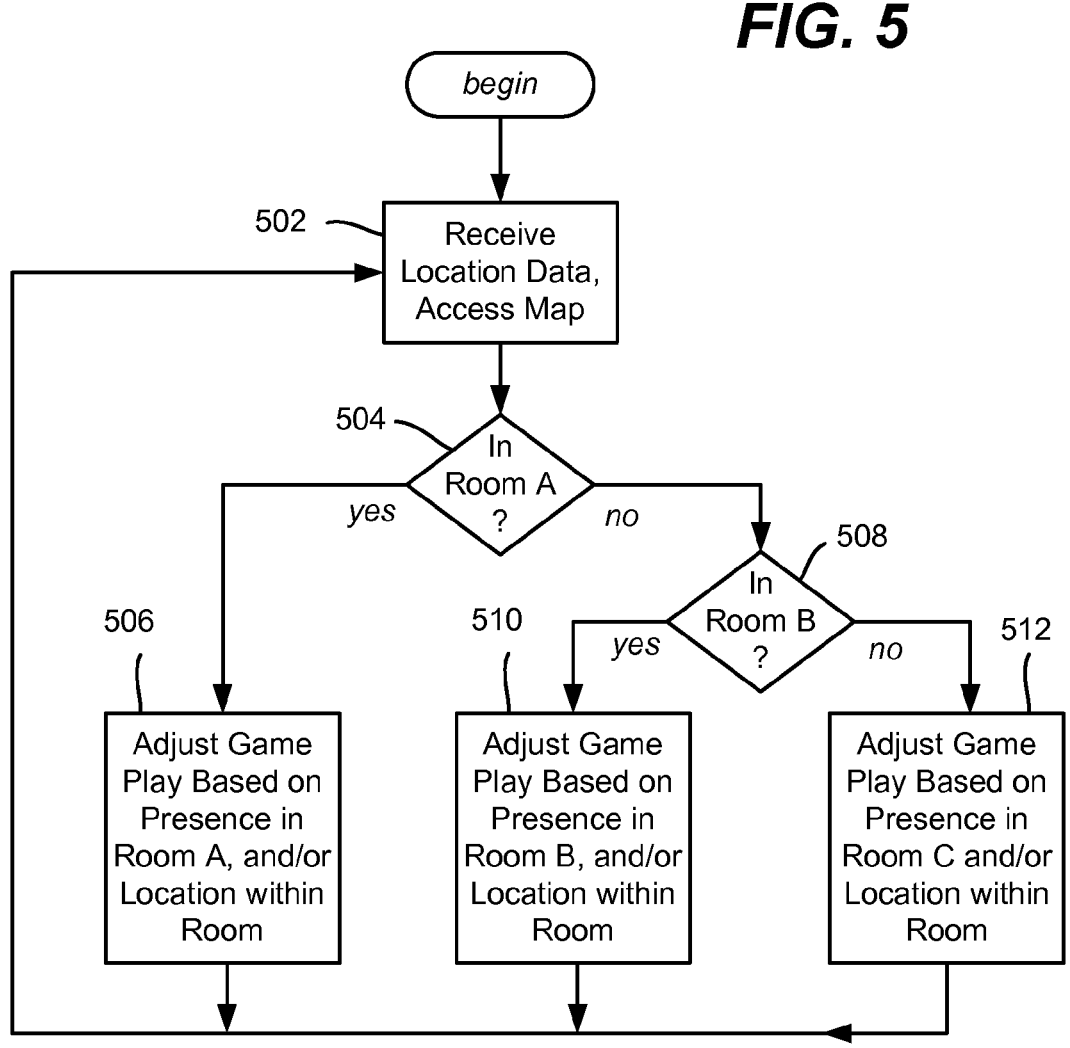
FIG. 5 is a flow diagram represents example steps of using location data to adjust game play, according to one example implementation.

FIG. 5 shows how location data may be used in a multi-room, game playing scenario, with the location data and map accessed at step 502 (at some level) to determine which room among rooms A, B and C a user is in. If a user is present in room A as determined by step 504, step 506 adjusts the game play for room A. If not, and the user is present in room B as determined by step 508, step 510 adjusts the game play for room B. If not in A or B (but sensed by a camera since location data is available), then the other alternative is room C, which is handled by step 512.

By way of example, consider a "treasure-hunt" game where the player (e.g., a child) is instructed to find an item (e.g., hidden by a parent) and hold the item up so the camera can see it in order to receive the next clue to another item, such as received on a smartphone carried by the player. The parent may interact with the camera in advance so that the hidden items' locations are precisely known. As the child plays, the child's location data can be used to guide the player to the correct room if needed, and when in the room, tell the player "cold" "warm" "getting warmer" "hot" and so forth for each item.

As can be seen, knowing a user's location in a mapped space provides for many usage scenarios that may benefit users. At the same time, by using camera sensing, the user need not take any explicit actions to participate in the tracking and receive the benefit of actions taken based upon the user's current location.

Example Operating Environment

It can be readily appreciated that the above-described implementation and its alternatives may be implemented within any suitable computing or electronics device having a circuit board, including a gaming system, personal computer, tablet, DVR, set-top box, smartphone, appliance, audio receiver, television and/or the like. Combinations of such devices are also feasible when multiple such devices are linked together. For purposes of description, a gaming (including media) system is described as one exemplary operating environment hereinafter. As can be readily appreciated, the various chip cooling techniques described above may be applied to any appropriate circuitry of the integrated circuits described below.

Figure 6:
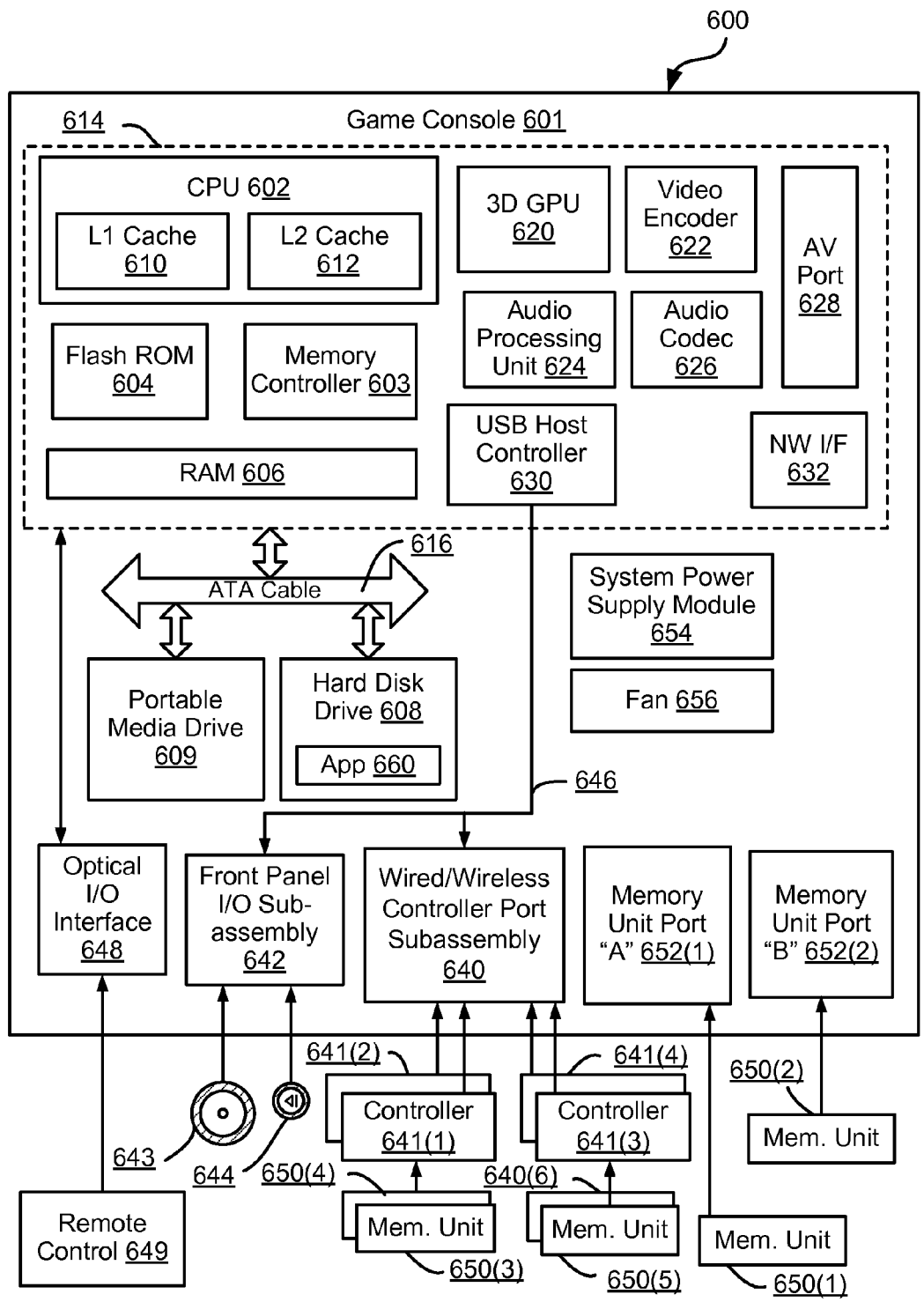
FIG. 6 is a block diagram representing an example non-limiting computing system or operating environment (e.g., in the form of a gaming console) in which one or more aspects of various embodiments described herein can be implemented.

FIG. 6 is a functional block diagram of an example gaming and media system 600 and shows functional components in more detail. Console 601 has a central processing unit (CPU) 602, and a memory controller 603 that facilitates processor access to various types of memory, including a flash Read Only Memory (ROM) 604, a Random Access Memory (RAM) 606, a hard disk drive 608, and portable media drive 609. In one implementation, the CPU 602 includes a level 1 cache 610, and a level 2 cache 612 to temporarily store data and hence reduce the number of memory access cycles made to the hard drive, thereby improving processing speed and throughput.

The CPU 602, the memory controller 603, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 602, the memory controller 603, the ROM 604, and the RAM 606 are integrated onto a common module 614. In this implementation, the ROM 604 is configured as a flash ROM that is connected to the memory controller 603 via a Peripheral Component Interconnect (PCI) bus or the like and a ROM bus or the like (neither of which are shown). The RAM 606 may be configured as multiple Double Data Rate Synchronous Dynamic RAM (DDR SDRAM) modules that are independently controlled by the memory controller 603 via separate buses (not shown). The hard disk drive 608 and the portable media drive 609 are shown connected to the memory controller 603 via the PCI bus and an AT Attachment (ATA) bus 616. However, in other implementations, dedicated data bus structures of different types can also be applied in the alternative.

A three-dimensional graphics processing unit 620 and a video encoder 622 form a video processing pipeline for high speed and high resolution (e.g., High Definition) graphics processing. Data are carried from the graphics processing unit 620 to the video encoder 622 via a digital video bus (not shown). An audio processing unit 624 and an audio codec (coder/decoder) 626 form a corresponding audio processing pipeline for multi-channel audio processing of various digital audio formats. Audio data are carried between the audio processing unit 624 and the audio codec 626 via a communication link (not shown). The video and audio processing pipelines output data to an A/V (audio/video) port 628 for transmission to a television or other display/speakers. In the illustrated implementation, the video and audio processing components 620, 622, 624, 626 and 628 are mounted on the module 614.

FIG. 6 shows the module 614 including a USB host controller 630 and a network interface (NW I/F) 632, which may include wired and/or wireless components. The USB host controller 630 is shown in communication with the CPU 602 and the memory controller 603 via a bus (e.g., PCI bus) and serves as host for peripheral controllers 634. The network interface 632 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 6, the console 601 includes a controller support subassembly 640, for supporting four game controllers 641(1)-641(4). The controller support subassembly 640 includes any hardware and software components needed to support wired and/or wireless operation with an external control device, such as for example, a media and game controller. A front panel I/O subassembly 642 supports the multiple functionalities of a power button 643, an eject button 644, as well as any other buttons and any LEDs (light emitting diodes) or other indicators exposed on the outer surface of the console 601. The subassemblies 640 and 642 are in communication with the module 614 via one or more cable assemblies 646 or the like. In other implementations, the console 601 can include additional controller subassemblies. The illustrated implementation also shows an optical I/O interface 648 that is configured to send and receive signals (e.g., from a remote control 649) that can be communicated to the module 614.

Memory units (MUs) 650(1) and 650(2) are illustrated as being connectable to MU ports "A" 652(1) and "B" 652(2), respectively. Each MU 650 offers additional storage on which games, game parameters, and other data may be stored. In some implementations, the other data can include one or more of a digital game component, an executable gaming application, an instruction set for expanding a gaming application, and a media file. When inserted into the console 601, each MU 650 can be accessed by the memory controller 603.

A system power supply module 654 provides power to the components of the gaming system 600. A fan 656 cools the circuitry within the console 601.

An application 660 comprising machine instructions is typically stored on the hard disk drive 608. When the console 601 is powered on, various portions of the application 660 are loaded into the RAM 606, and/or the caches 610 and 612, for execution on the CPU 602. In general, the application 660 can include one or more program modules for performing various display functions, such as controlling dialog screens for presentation on a display (e.g., high definition monitor), controlling transactions based on user inputs and controlling data transmission and reception between the console 601 and externally connected devices.

The gaming system 600 may be operated as a standalone system by connecting the system to high definition monitor, a television, a video projector, or other display device. In this standalone mode, the gaming system 600 enables one or more players to play games, or enjoy digital media, e.g., by watching movies, or listening to music. However, with the integration of broadband connectivity made available through the network interface 632, gaming system 600 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for processing camera data to determine a location within a space, the method comprising:
   capturing camera data corresponding to camera-based coordinates of a tracked object;
   accessing a map of the space;
   converting the camera data corresponding to the camera-based coordinates of the tracked object into location data based upon the map of the space, the location data corresponding to space-based coordinates representative of a location of the tracked object relative to the space; and
   outputting, to at least one application or device having access to the map of the space, the location data, such that the at least one application or device is configured to take an action based upon the space-based coordinates representative of the location of the tracked object relative to the space and independent of the camera-based coordinates.

2. The method of claim 1 further comprising, tracking the tracked object relative to the space over time based upon one or more changes in the location data.

3. The method of claim 1 further comprising, tracking a plurality of objects relative to the space, one or more objects independently tracked over time based upon one or more changes in the location data for the one or more objects, the one or more objects including the tracked object.

4. The method of claim 1 further comprising, uploading the location data to a cloud service that is accessible by the at least one remote application or device based upon a predetermined threshold to facilitate managing a bandwidth consumed by the at least one remote application or device.

5. The method of claim 1 further comprising, transmitting, to the at least one remote application or device, the location data, wherein the at least one remote application or device is configured to take the action based upon the space-based coordinates representative of the location of the tracked object relative to the space, the action including at least one of: change power state, change audio state, or change a device state.

6. The method of claim 1 further comprising transmitting, to the at least one remote application or device, the location data, wherein the at least one remote application or device is configured to take the action based upon the space-based coordinates representative of the location of the tracked object relative to the space, the action including selecting content based upon the location data.

7. The method of claim 1 further comprising transmitting, to the at least one remote application or device, the location data, wherein the at least one remote application or device is configured to take the action based upon the space-based coordinates representative of the location of the tracked object relative to the space, the action including adjusting game play based upon the location data.

8. The method of claim 1 further comprising transmitting, to the at least one remote application or device, the location data, wherein the at least one remote application or device is configured to take the action based upon the space-based coordinates representative of the location of the tracked object relative to the space, the action including outputting signals corresponding to one or more remote control codes to control an appliance.

9. The method of claim 1 wherein converting the camera data corresponding to the camera-based coordinates of the tracked object into the location data comprises receiving, from a first entity, a first request to receive a first level of location data granularity, receiving, from a second entity, a second request to receive a second level of location data granularity, processing the space-based coordinates into a first set of more coarse-grained location data and into a second set of more fine-grained location data, transmitting, to the first entity, the first set of more coarse-grained location data based on the first request to receive the first level of location data granularity, and transmitting, to the second entity, the second set of more fine-grained location data based on the second request to receive the second level of location data granularity.

10. The method of claim 1 further comprising, building at least part of the map based upon camera sensing.

11. A system comprising, a service, the service coupled to or incorporating a location conversion mechanism located on one or more of a local computing device and a remote computing device, the location conversion mechanism configured to capture camera data corresponding to camera-based coordinates of a user, access map data associated with a mapped space, and convert the camera data corresponding to the camera-based coordinates into location data corresponding to spaced-based coordinates representative of a user location relative to the mapped space based upon the map data associated with the mapped space, the service configured to output the location data to one or more devices or applications configured to access the mapped data associated with the mapped space such that the one or more devices or applications are configured to take an action based upon the space-based coordinates representative of the user location relative to the mapped space and independent of the camera-based coordinates.

12. The system of claim 11 wherein the service is configured to output the location data to push the location data to at least one of the one or more devices or applications, and to output the location data in response to one or more pull requests from at least one or more devices or applications.

13. The system of claim 11 wherein the service comprises a cloud service accessible via a network connection.

14. The system of claim 13 wherein the cloud service is accessed by a device or set of devices comprising at least one of: a smartphone, a tablet, a personal computer, a gaming console, or an appliance.

15. The system of claim 11 wherein the camera data corresponding to the camera-based coordinates are based upon data provided by at least one depth camera.

16. The system of claim 11 wherein the camera data corresponding to the camera-based coordinates are based upon data provided by a plurality of cameras that sense the mapped space from different camera positions, each camera having a position identified in the map data.

17. The system of claim 11 wherein the map includes speaker location data or display location data, or both speaker location data and display location data.

18. One or more computer-readable storage devices media having computer-executable instructions that, upon execution, causes at least one processor to perform operations comprising:
   capturing camera data corresponding to camera-based coordinates of a tracked object;
   accessing a map of the space;
   converting the camera data corresponding to camera-based coordinates of the tracked object into location data based upon the map of the space, the location data corresponding to space-based coordinates representative of a location of the tracked object relative to the space; and taking action based upon the location data corresponding to the space-based coordinates representative of the location of the tracked object relative to the space, and independent of the camera-based coordinates, the action including at least one of: selecting content for output, modifying game play, controlling power, controlling audio output, controlling video output, signaling a device with remote control codes, or controlling at least one setting.

19. The method of claim 1 further comprising:

determining whether a tracked object is within the space; and upon determining that the tracked object is within the space, determining one or more actions.

20. The method of claim 1 further comprising:

determining whether a tracked object is within the space; and upon determining that the tracked object is not within the space, determining one or more actions.

\* \* \* \* \*